UNITED STATES PATENT OFFICE.

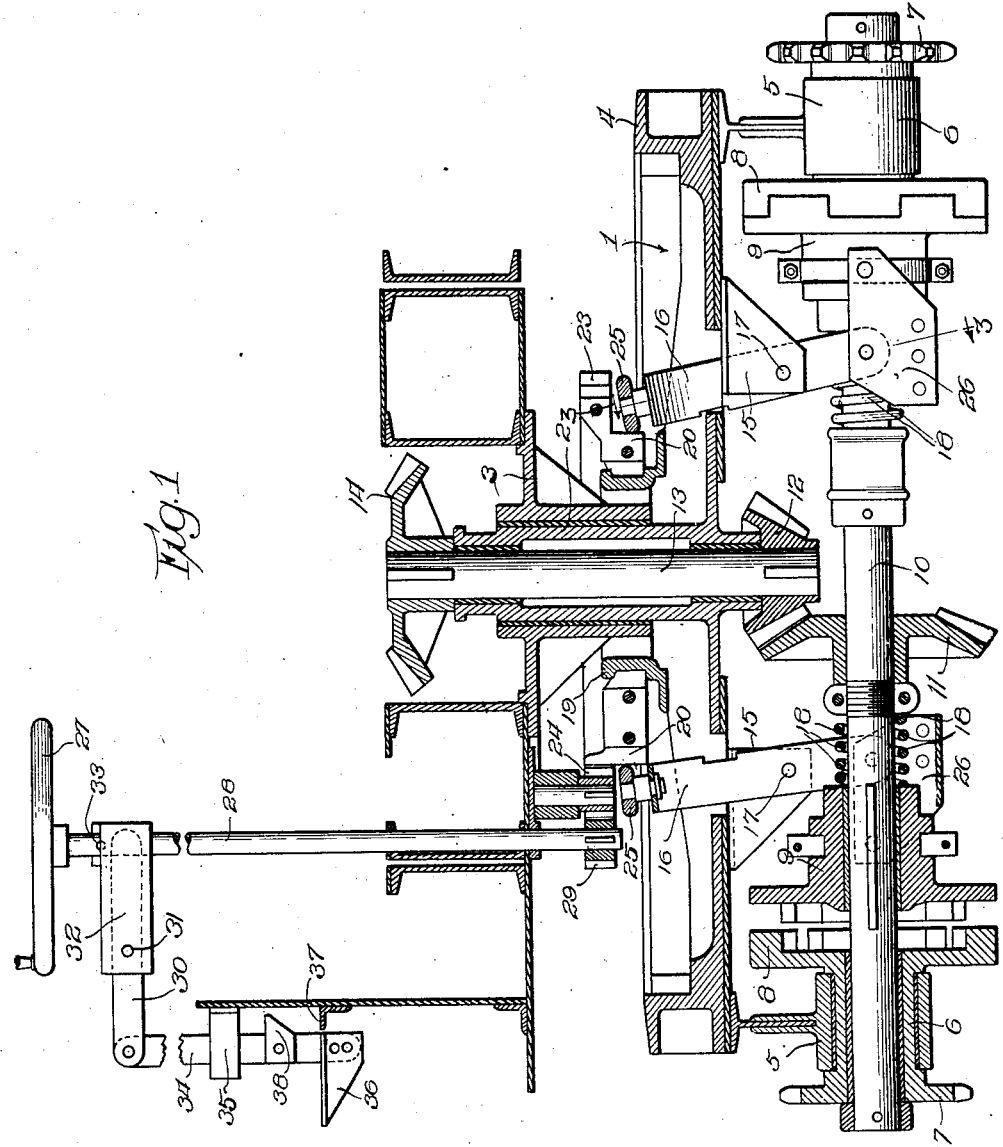

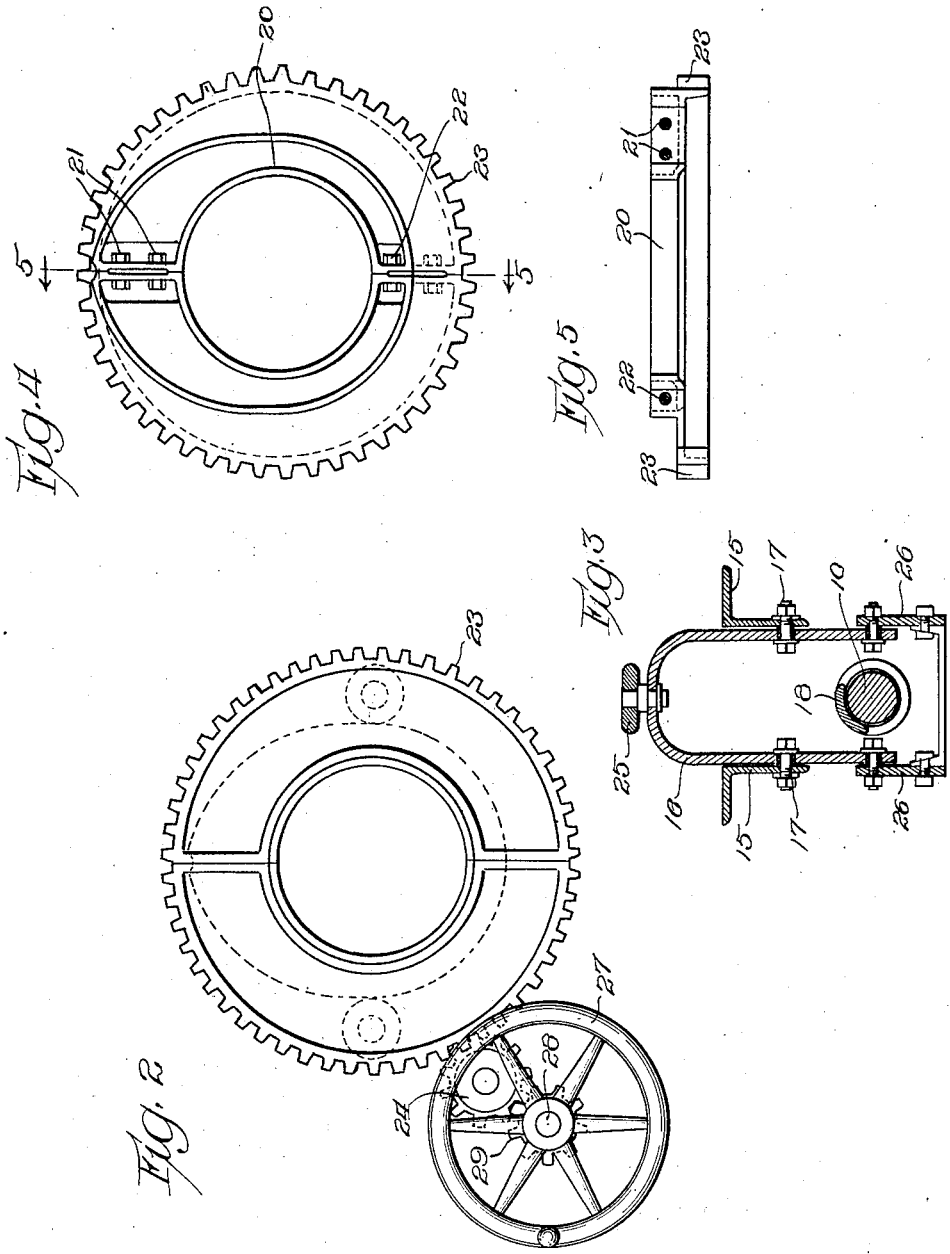

CHARLES E. STAHL, OF WINTHROP HARBOR, ILLINOIS, ASSIGNOR TO FREDERICK C. AUSTIN, OF CHICAGO, ILLINOIS.

COMBINED DRIVING AND STEERING GEAR.

1,388,669.  Specification of Letters Patent.  Patented Aug. 23, 1921.

Application filed October 18, 1919. Serial No. 331,604.

*To all whom it may concern:*

Be it known that I, CHARLES E. STAHL, a citizen of the United States, and a resident of Winthrop Harbor, Illinois, have invented a certain new and useful Improvement in Combined Driving and Steering Gears, of which the following is a specification.

This invention relates to self-propelled vehicles and more particularly to the power transmitting connections for both driving and steering the vehicle. Combined steering and driving means of this kind are employed, for example, in tractors, and more particularly in those which have caterpillar traction belts, the steering being accomplished by stopping either belt while the other is allowed to continue in operation. This same arrangement, of course, is employed in larger and heavier machines such as excavators and machines for handling materials, but which are self-propelled, and therefore in the same general class of self-propelled vehicles. The invention relates more especially to machines of this kind which have a turn-table body upon which the source of motive power is located, and upon which the steering means are also located, whereby it becomes desirable to associate both the driving transmission and the steering gear with the vertical axis about which the turn-table body is mounted to turn or revolve.

Generally stated, the object of the invention is to provide an improved construction and arrangement whereby oppositely arranged clutches are controllable from the turn-table body, through the medium of pivoted levers for shifting the clutches, and a cam which rotates about the axis of the turn-table, thus insuring a strong and effective steering gear which will not be liable to get out of order, and whereby the machine may be steered by controlling the transmission of power to the caterpillar belts or other traction means arranged at opposite sides of the machine.

It is also an object to provide certain details and features of construction and combinations tending to increase the general efficiency and the desirability of a combined steering and driving gear mechanism of this particular character.

To these and other useful ends the invention consists in matters hereinafter set forth and claimed and shown in the accompanying drawings, in which—

Figure 1 is a vertical section of a combined driving and steering gear mechanism embodying the principles of the invention.

Fig. 2 is a plan of the hand wheel which forms the steering means, and the gearing connected thereto, showing the afore-mentioned cam in dotted lines.

Fig. 3 is a detail section on line 3—3 in Fig. 1.

Fig. 4 is a plan view of the said cam by which the clutches are controlled.

Fig. 5 is a section on line 5—5 in Fig. 4.

As thus illustrated, the invention comprises a truck frame 1 provided with a turntable post 2 upon which is suitably supported the turn-table body 3, said truck frame being preferably provided with a circular track 4 for the wheels or rollers (not shown) with which the turn-table body is provided. Said truck frame is provided with bearings 5 in which are supported the rotary sleeves 6 which are provided at their outer ends with sprocket wheels 7 which are connected in the usual manner with the caterpillar traction belts (not shown) of the tractor or other self-propelled vehicle or machine. The inner ends of these sleeves 6 are provided with clutch members 8 which coöperate with the slidable clutch members 9, the latter being splined on the shaft 10 supported in said sleeves. A bevel gear 11 on said shaft engages a bevel pinion 12 on the lower end of the vertical shaft 13, which latter is supported in suitable bearings on the center post 2 of the turn-table, and provided with a bevel 14 at its upper end. It will be understood that this bevel 14 is suitably connected with power transmitting connections and a source of power (not shown) of any suitable character on the turn-table body. Brackets 15 are secured to the under side of the truck frame 1, and yokes 16 are pivoted at 17 on said brackets. The clutch members 9 are suitably connected with the lower ends of the yokes 16, so that the latter serve as levers for shifting the splined or keyed members of the clutches, thereby to open and close the latter. Springs 18 are suitably applied to the shaft 10 to push the clutch members 9 into engagement with the clutch members 8, whereby said springs tend always to keep the clutches closed. The truck frame has an upstanding annular portion 19 which is encircled by the cam 20, the latter being made in two parts and bolted together at 21 and 22, after the two parts are placed in engagement with said bearing. It will be seen that this cam has rigid gear teeth 23 arranged in a circle outside of the periphery of the cam, and these gear teeth are engaged by an idler 24 suitably mounted on the bottom of the turntable body. Rollers 25 on the upper ends of the yokes 16 engage the cam 20, so that the yokes 16 are tilted about their pivots 17, by the rotation of the cam, the formation of said cam being such that one clutch is always closed when the other is open, and so that by turning the cam to its neutral position both clutches will be permitted to remain closed. Said yokes have side portions (see Fig. 3) which extend downwardly at opposite sides of the shaft 10, and these side portions are suitably connected by the plates 26 with the hubs of the clutch members 9, in any suitable, known or approved manner, so that tilting of the yokes 16 about their pivots 17 will shift the members 9 and thereby open or close the clutches.

The steering means on the turn-table body are as follows: A hand wheel 27 is provided on the upper end of a shaft or steering column 28, the latter being supported in any suitable manner on a turn-table body, and being provided with a pinion 29 at its lower end. This pinion 29 engages the idler 24, whereby rotation of the hand wheel 27 will cause rotation of the cam 20, with the result that the yokes 16 are shifted to control the clutches. Any suitable means can be employed for turning or revolving the turn-table body 3 about its vertical axis, and at such a time it is desirable that the pinion 29 be disengaged from the idler 24, so that the hand wheel shaft 29 will not be rotated by the rotation of the turn-table body. For this purpose, therefore, the shaft 28 is movable up and down, and this is accomplished by a forked lever 30 which is pivoted at 31 on any suitable portion 32 of the general structure of the machine. This lever 30 engages a transverse pin 33 on the vertical shaft 28, so that when the outer end of the lever 30 is pushed down the hand wheel and its shaft will be raised. Preferably, this is accomplished by means of a bar 34 which has its upper end connected to the outer end of the lever 30, and which slides up and down in a guide 35 on the structure of the machine. The lower end of this bar 34 is provided with a foot-piece 36, so that by placing the foot on this, the lever 30 will be operated in the required manner. In order to keep the shaft 28 in its raised position, a projection 37 is provided on the frame of the turn-table, and the bar 34 has a catch 38 which is beveled to pass the projection 37 when the bar 34 is pulled downwardly, but which will slip in below the projection 37 and thereby lock the bar 34 against upward movement. The bar 34 can be released from this position, of course, by pulling its lower end outwardly, and the hand wheel shaft 28 will then be lowered to again bring the pinion 29 into operative engagement with the idler 24, thereby reëstablishing the steering gear in operative condition for controlling the clutches.

Thus, the turn-table body 3 and the cam 20, together with the overhanging gear teeth 23, all rotate about the same vertical axis, which axis is formed by the vertical shaft 13 which transmits power from the turn-table body to the transverse shaft 10 upon the ends of which latter are mounted the traction driving means 7, as previously explained, whereby the vehicle is driven and steered by the same means. The steering devices are operative to control the transmission of power to opposite sides of the vehicle, in the manner specified, regardless of the position in which the turn-table body may be turned, inasmuch as the idler 24 always engages the teeth 23 of the gear wheel.

What I claim as my invention is:—

1. In driving and steering gear for motor driven vehicles, the combination of oppositely arranged clutches, one for each side of the vehicle, a truck frame on which said clutches are supported, a turn-table body supported on the truck frame to turn about a vertical axis, power transmitting instrumentalities for communicating power to said clutches from a source on said body and through said axis thereof to drive the vehicle, a cam mounted to rotate about said axis, mechanism supported on said truck frame and having means for engaging said cam to control said clutches, and steering means on said body to rotate said cam.

2. A structure as specified in claim 1, said mechanism including pivoted levers having their lower ends connected to said clutches and their upper ends provided with said means for engaging the cam.

3. A structure as specified in claim 1, said cam being disposed between the truck frame and said body, and said steering means including gear teeth rigid with said cam and a pinion for engaging said gear teeth.

4. A structure as specified in claim 1, there being a horizontal shaft extending through said clutches, and said mechanism including pivoted yokes which extend downward from said cam to said clutches, said shaft extending between the lower ends of each yoke.

5. In combined driving and steering mechanism, the combination of a truck frame having traction driving means at each side thereof, and provided with a bearing to form a central vertical axis a cam mounted to rotate on said bearing about said axis, a turn-table which is rotatable about said axis, means adapted to rotate about said axis for transmitting driving power to operate said driving means, mechanism controlled by said cam to control the transmission of driving power, and steering means for rotating said cam.

6. A structure as specified in claim 5, said mechanism comprising a pair of pivoted levers having their upper ends provided with means for engaging said cam, and having their lower ends connected to control the transmission of driving power.

7. A structure as specified in claim 5, said cam being made in sections and bolted together around said bearing.

8. In a machine having steering gear, the combination of a truck body, a turn-table mounted thereon to rotate about a vertical axis, steering means including a gear, means operated by the rotation of said gear to steer the machine, rotatable about said axis, a steering hand wheel shaft having its lower end gear-connected with said gear, and means for raising said shaft to open the gear connection therefrom to said gear when the turntable is rotated.

9. A structure as specified in claim 8, in combination with means for locking the shaft in raised position, substantially as shown and described.

10. In a self propelled vehicle, the combination of a truck frame, a transverse shaft on said frame, traction driving means on the opposite ends of said shaft, clutches to connect said shaft to said driving means, a vertical shaft having its lower end connected to drive said transverse shaft, controlling means for said clutches, actuating means rotatable about said vertical shaft to actuate said controlling means, means on the upper end of said vertical shaft to communicate power thereto for driving the horizontal shaft, a turntable body rotatable about said vertical shaft, steering means on said turntable, and gearing to connect said steering means to said actuating means.

11. A structure as specified in claim 1, having provisions whereby either clutch is opened without opening the other, to steer the vehicle to the right or the left, and whereby both clutches are closed to drive the vehicle straight ahead.

12. A structure as specified in claim 1, said actuating means comprising a rotary cam and a tubular bearing for said vertical shaft on said truck, forming a pivot for said turntable, said gearing comprising gear teeth which overhang the outer edges of said cam and a pinion engaging said teeth, and said controlling means including pivoted arms and springs to yieldingly hold said arms in engagement with said edge of the cam.

13. In combined driving and steering mechanism, the combination of a truck frame provided with a bearing, a cam mounted on said bearing to rotate about a vertical axis, a turn-table which is rotatable about said axis, means for transmitting driving power through said axis, mechanism operated by said cam to control the transmission of driving power, and steering means for rotating said cam, said mechanism comprising a pair of pivoted levers having their upper ends provided with means for engaging said cam, and having their lower ends connected to control the transmission of driving power.

14. In combined driving and steering mechanism, the combination of a truck frame provided with a bearing, a cam mounted on said bearing to rotate about a vertical axis, a turn-table which is rotatable about said axis, means for transmitting driving power through said axis, mechanism operated by said cam to control the transmission of driving power, and steering means for rotating the cam, said cam being made in sections and bolted together around said bearing.

15. In steering gear the combination of a truck body, a turn-table mounted thereon to rotate about a vertical axis, steering means including a gear rotatable about said axis, a steering hand wheel shaft having its lower end gear-connected with said gear, and means for raising said shaft to open the gear connection therefrom to said gear, in combination with means for locking the shaft in raised position, substantially as shown and described.

16. In a traction vehicle, the combination of a gear wheel, traction driving means, mechanism controlled by the rotation of said gear wheel to control the transmission of power to said traction driving means, a turn-table body, a vertical steering shaft on said turn-table, a pinion on the lower end of said shaft to operate said gear wheel, and devices to raise the shaft to disconnect said pinion from said gear when the turntable is rotated.

17. A structure as specified in claim 16, said devices comprising a pivoted lever engaging the shaft, a vertical member hung on said lever, and a foot piece on said member.

18. A structure as specified in claim 16, in combination with means on said devices to lock said shaft in raised position.

CHARLES E. STAHL.